(12) United States Patent
Sola

(10) Patent No.: US 11,685,519 B2
(45) Date of Patent: Jun. 27, 2023

(54) WING TIPS AND WING TIP CONSTRUCTION AND DESIGN METHODS

(71) Applicant: ARCHANGEL AEROSPACE LTD, Harwell (GB)

(72) Inventor: Daniel John Peter Sola, Oxford (GB)

(73) Assignee: Archangel Aerospace Ltd., Oxfordshire (GB)

( * ) Notice: Subject to any disclaimer, the term of this patent is extended or adjusted under 35 U.S.C. 154(b) by 103 days.

(21) Appl. No.: 17/043,516

(22) PCT Filed: Mar. 29, 2019

(86) PCT No.: PCT/GB2019/050938
§ 371 (c)(1),
(2) Date: Sep. 29, 2020

(87) PCT Pub. No.: WO2019/186208
PCT Pub. Date: Oct. 3, 2019

(65) Prior Publication Data
US 2021/0147071 A1 May 20, 2021

(30) Foreign Application Priority Data
Mar. 29, 2018 (GB) ..................... 1805279

(51) Int. Cl.
*B64C 23/06* (2006.01)
(52) U.S. Cl.
CPC .......... *B64C 23/072* (2017.05); *B64C 23/076* (2017.05)
(58) Field of Classification Search
CPC .... B64C 23/072; B64C 23/076; B64C 23/069
See application file for complete search history.

(56) References Cited

U.S. PATENT DOCUMENTS

| | | | |
|---|---|---|---|
| 4,190,219 A | 2/1980 | Hackett | |
| 5,348,253 A | 9/1994 | Gratzer | |
| 7,644,892 B1 * | 1/2010 | Alford, Jr. | ............ B64C 23/065 244/35 R |
| 7,971,832 B2 | 7/2011 | Hackett et al. | |
| 2011/0031354 A1 * | 2/2011 | Kelleher | ............... B64C 23/069 244/45 R |
| 2017/0073062 A1 | 3/2017 | Firth | |

FOREIGN PATENT DOCUMENTS

| | | |
|---|---|---|
| DE | 202004014384 U1 | 11/2004 |
| DE | 102008022452 A1 | 12/2009 |
| EP | 2281747 A2 | 2/2011 |
| EP | 3296202 A1 | 3/2018 |

OTHER PUBLICATIONS

International Search Report and Written Opinion for Application No. PCT/GB2019/050938 dated May 21, 2019 (14 pages).
International Preliminary Report on Patentability for Application No. PCT/GB2019/050938 dated Oct. 8, 2020 (8 pages).

* cited by examiner

*Primary Examiner* — Rodney A Bonnette
(74) *Attorney, Agent, or Firm* — Michael Best & Friedrich LLP

(57) ABSTRACT

An air-redirection formation for a tip portion of an aerofoil such as an aircraft wing includes: a first portion, which includes a first surface which forms a continuation of the aerodynamic lifting surface of the wing, and which is for directing vortices away from the aerofoil; and a second portion, which is spaced from the first portion and which is positioned to generate uplift due to the directed vortices.

20 Claims, 3 Drawing Sheets

WING TIPS AND WING TIP CONSTRUCTION AND DESIGN METHODS

CROSS REFERENCE TO RELATED APPLICATIONS

This application is a national stage filing under 35 U.S.C. § 371 of International Patent Application No. PCT/GB2019/050938, filed Mar. 29, 2019, which claims priority to United Kingdom Patent Application No. 1805279.5, filed Mar. 29, 2018, the entire contents of which are hereby incorporated by reference herein.

FIELD OF THE INVENTION

The present invention relates to an air-redirection formation suitable to be provided on an aerofoil, such as a wing of an aircraft. The invention further relates to an aircraft having an air-direction formation at a tip portion of each wing.

BACKGROUND OF THE INVENTION

U.S. Pat. No. 7,971,832 discloses a "winglet" device provided at a tip portion of a fixed-wing aircraft, and defining a surface which is a continuation of the aerodynamic lifting surface of the wing. The tip device has the function of reducing draft, by minimising the effects on the wing of caused by vortices developing at the trailing edge of the wing, due to the pressure differential between the air below the wing and the air above the wing. This, and related work, showed that a swept back and downward canted tip preferentially moves the vortex further outboard and reduces the intensity. However, no use is made of this purposely redirected airflow.

U.S. Pat. No. 5,348,253 similarly shows a "blended winglet", which is a wing-like device attachable to an airplane wing tip to achieve minimum induced drag for a given surface size. The wing tip includes a contoured surface which projects either above or below the wing plane and laterally from its tip.

SUMMARY OF THE INVENTION

The present invention proposes in general terms that a tip portion of an aerofoil is provided with an air-redirection formation including a surface which is positioned to generate uplift due to air vortices shed from the aerofoil.

More specifically, the invention proposes an air-redirection formation for a tip portion of an aerofoil which includes:
  a first portion, which includes a first surface which forms a continuation of the aerodynamic lifting surface of the aerofoil, and which is for directing vortices away from the aerofoil, potentially but not necessarily curving downwards to an angle greater than 45 degrees from horizontal into a connecting section (or "connection structure"), described separately; and
  a second portion, which includes a second surface (which may be nominally horizontal), and which is spaced from the aerofoil via the first portion and which is positioned to interact with (typically to generate uplift due to) the directed vortices.

The second surface may not be strictly horizontal in use but will preferably have a deviation from horizontal of less than 45 degrees. The second portion will have a mean aerodynamic chord (MAC) of less than the main wing and more than 5%, 10%, 15%, 20%, or 25% of the main wing, defining the second section as starting when the second surface is within 45 degrees of horizontal.

Here the term "horizontal" may be defined as level with the aerofoil (e.g. it may be defined as including multiple cords—imaginary straight lines joining the leading and trailing edges of the wing). Alternatively, in the case that the aerofoil is part of an aircraft, it may be defined based on the body of the aircraft. Note that conventionally wings are dihedral (angled up from the horizontal as defined by the aircraft body) or anhedral (angled downward from the horizontal as defined by the aircraft body), and indeed may have varying dihedral angle along the wing from wing root to wing tip. Instances of "horizontal" in this document are disclosures of both these possibilities (i.e. defining "horizontal" with reference to the aerofoil or with reference to the aircraft body).

Major benefits of the proposed tip are to simultaneously reduce induced drag and modifying (typically increasing) net lift whilst unloading wing bending moment and/or the wing twisting moment under higher speed conditions (due to a neutralising moment applied by the device at the tip and associated modification of the lift profile), allowing an overall reduction in structural mass and possible expansion of the flight envelope.

The first portion deviates away from aerofoil (or "main wing") plane.

Thus, the first surface reduces drag by curtailing airflow over the tip and re-directing vortices generated by the aerofoil away from the aerofoil. In the base operating case ("nominal" flight conditions) the second surface may utilise the vortices shed from the aerofoil and directed by the first surface to provide lift. Thus, the weight of the formation is approximately offset by the additional lift, so that the stability and control benefits of the device are provided without a net penalty.

The second surface is spaced far enough away from main wing, via the first surface, such that it does not cause significant interference with the operation of the main wing or first surface. This separation may be greater than 50% of the main wing MAC. The air-redirection formation directs and utilises rearwards circular/spiral airflow ("corkscrew vortices"), thereby allowing drag reduction and improved lift.

The second surface may incorporate an amount of 'sweep' to further maximise utilisation of the airflow and for traditional aerodynamic stability reasons.

Passive control of wing twist may be provided by the rear portion of the present air-redirection formation. During flight, efficient wings often tend to generate a pitching forwards moment. The rear portion of the air-redirection formation can counter this effect by providing a little less lift than its weight. At higher speeds when the wing tip begins to twist further, the air-redirection formation may decrease its angle of attack and, depending on the aerofoil section chosen, may prevent the wing from over-twisting. This would have the effect of expanding the safe flying speed. Active control (as described in the next paragraph) would further enhance this benefit and, in the case of aircraft in particular, would reduce the dependency on fine-tuned aerodynamics for all flight conditions.

Optionally, the rotational and/or translational position of the first and/or second surface relative to the aerofoil is controllable, thereby providing an additional flight control surface.

Various types of control are possible. Specifically, the control may comprise any one of more of the following:

Rotation of the whole device, or at least one portion of the device (such as the second portion), around a central elongate axis of the aerofoil (known as the "the span axis"). This form of control movement will vary a moment about the span axis. The positioning of the first portion of the air-redirection formation near the end of the wing (whether inside or outside of the wing tip itself) means that rotation about the span axis will also give a moment about the chord axis for the aircraft as a whole; the force generated behind the wing tip could give both pitch and roll control (functioning as virtual elevator when in sync on both wing tips for pitch control, virtual ailerons when not synchronised for roll control or hybrid 'elevons' for both pitch and roll control. This form of active control is particularly useful to control the angle of attack at the wing tip (and therefore the local lift forces and pitching moments generated) under varying speed conditions. It may be even be desirable to induce negative lift on the rear portion of the device in order to maintain the aerostructure within safe loading conditions.

Rotation of the device, or at least one portion of the device (such as the second portion), about the yaw axis, functioning to a limited extent like a virtual rudder to give yaw control. This typically has roll and possibly pitch coupling.

Rotation of the device, or at least one portion of the device (such as the second portion), about the chord axis. This allows the second portion to be stability-neutral or dihedral or anhedral in the resulting angle with the aerofoil (or 'main wing' for an aircraft case), and thus affects the stability of the aerofoil. This can assist in mitigating 'dutch roll' and dynamically optimise spiral stability vs aerodynamic efficiency, as well as assisting in making coordinated turns. This form of control will also give potential for roll and pitch control, in a similar way to rotation about the span axis, albeit with only the ability to reduce the moments about the span axis. Assuming a long, high aspect ratio wing, this control method would preferentially produce a roll effect.

Control movements can be achieved using articulated hinges on or in the wing tip device or at the join to the aerofoil (or 'main wing' for an aircraft case). Alternatively, instead of a hinge, control movements can be achieved by deforming (i.e. controlling the shape of) a portion of the formation, such as the connection structure. This may be termed wing warping or wing morphing—that is, bending, twisting, expansion, contraction, thickening or any combinations of one or more of these, or other deformation of at least a portion of the formation—and can be used instead of a hinge, such that a rotation (curve or twist) is spread over a length of the portion of the formation rather than being concentrated at a hinge.

One or more of these control methods may be used to give overall attitude control for the aircraft, to optimise local airflow and efficiency along the wing, or to unload the structural forces through the wing structure.

The air-redirection formation is preferably provided as a device which is separate from, but connectable to, a tip portion of the aerofoil. The device may be formed as a single element having a surface which is a continuous curved sweep, or the device may be formed of multiple joined sections, e.g. straight sections which are joined to each other at angles. The curvature of any surface of the device may be selected to adjust the local angle of incidence of air onto the device.

The aerofoil may be any structure generating aerodynamic forces, including turbine blades, propellers and rotor discs, measurement devices, or wind energy generation devices. In a preferred case, the aerofoil may be a wing of an aircraft, such as a fixed-wing aircraft. One application is for high efficiency aircraft. Notable examples include competition gliders and solar-electric high altitude pseudo-satellites (HAPS). A HAPS would particularly benefit from potential higher aerodynamic efficiency due to better lift generation on the main wing with reduced drag, lower mass due to unloading the primary structure and higher airspeed limits specifically due to counter-acting the torsional forces at high speed, better high altitude stability (potentially increasing the operational ceiling) due to active counteraction of dutch roll and even the minor benefit of increased area for mounting photovoltaic panels. Alternatively, the aerofoil may be a portion of a kite, car, ship and any other vehicle. Indeed the present air-redirection formation may be provided for any aerofoil application for deliberate aerodynamic force generation and/or moderation.

Referring to the aerodynamic lifting surface of the aerofoil (the "main surface of the aerofoil") as lying in and defining a "horizontal plane", the first surface may be provided as a horizontal or near-horizontal surface, deviating less than 45 degrees from horizontal (and optionally by less than 30 degrees or less than 20 degrees), and the first portion of the formation may project in a horizontal or near-horizontal direction from a tip portion of the main surface of the aerofoil.

Similarly, the second surface may be horizontal or near-horizontal. In the case that the position of the second portion of the air-redirection device is controllable, this may change the relationship of the second surface to the horizontal plane.

The first and/or second portions of the air-redirection formation may extend generally parallel to an elongation axis of the aerofoil.

Alternatively, at least the first portion of the air-redirection formation may extend rearwardly from the main surface of the aerofoil in a direction opposite to the direction in which the aerofoil passes through the ambient air. In the case that that the aerofoil is a wing, the end of the first portion of the air-redirection device which is furthest from the body of the aircraft may be slightly inboard or slightly outboard of the tip of the wing.

The second portion of the air-redirection surface is further from the body of the aircraft than the first portion. In the front-rear direction, it may be in line with a central axis of the wing, or may be positioned forwardly ("swept forward") or backwardly ("swept back") with respect to this axis. It may be in the horizontal plane of the wing, above or below it.

The first and/or second surfaces may, in the case that the aerofoil is the wing of an aircraft, be level or canted in the dihedral or anhedral directions. The degree of canting may, in the case that the position of the second portion of the air-redirection device is controllable, depend upon that controlled position.

The first and second portions of the air-redirection formation are connected by a connection structure, which may be distinguishable from the first and second portions by having a smaller maximum thickness than the maximum thickness or chord length of the first and/or second portions of the air-redirection structure.

The first portion of the device may have a gradually reducing minimum thickness, though the direction of this minimum thickness may diverge from that of the main aerofoil chord direction (generally defined to be parallel to the freestream airflow in the lateral plane, though often with a pitch angle deviating from the lateral plane). The length in the chord direction will nominally reduce along the device with the exception of one group of implementations: if the wing tip device has an extreme sweep such that it is extending straight back, perpendicular to the main wing, then the length in the chord direction (approximately the freestream airflow direction) may actually increase, even though the local minimum thickness dimension of the device will still tend to reduce. Some (and possibly all) of the connecting section or the second portion of the device may have a greater length in the direction of the main aerofoil chord (approximately the freestream airflow direction) than the main aerofoil itself.

The connection structure may optionally be provided as at least two joined connection elements (which may be integral with each other, or separately but connected together). Each of the connection elements may generally extend in (e.g. have an elongation direction which is) a direction which has a component which is transverse to the horizontal plane. Optionally, one of the connection elements, which is connected to the first portion of the air-redirection formation, may have an elongation direction which extends away from the first portion of the air-redirection formation, and which has a component transverse to the horizontal plane in a first direction; and a second of the connection elements, which is connected to the second portion of the air-redirection formation, may have an elongation direction which extends away from the second portion of the air-redirection formation, and which has a component transverse to the horizontal plane in the same first direction.

For example, in the case that the aerofoil is a wing of an aircraft, both the first and second connection elements may project generally "downwardly" (e.g. as perceived by a person in the body of the aircraft) away from the respective first and second portions of the air-redirection formation. The first and second connection elements may be connected to each other (directly or via a third connection element) at ends of the first and second connection elements which are respectively distal from the first and second portions of the air-redirection formation.

BRIEF DESCRIPTION OF THE FIGURES

Embodiments of the invention will now be described, for the sake of example only, with reference to the following drawings in which.

DETAILED DESCRIPTION OF THE EMBODIMENTS

Referring firstly to FIG. 1 to FIG. 4, an aircraft is illustrated having two fixed wings 1. The body of the aircraft (not shown) is in the central position 3 indicated in FIG. 4. A respective tip portion of each wing 1, furthest from the central body of the aircraft, is provided with an air-redirection formation 2 connected to the tip portion of the wing.

Figure 1:
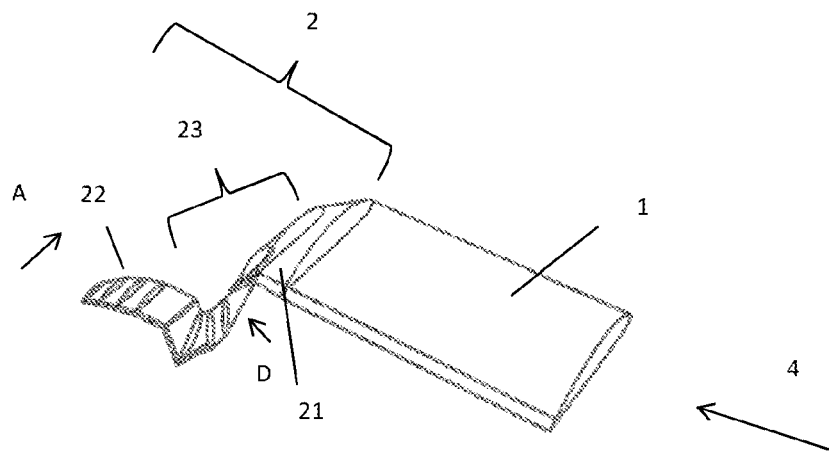
FIG. 1 is a top perspective view of a device which is a first embodiment of the invention positioned on the tip portion of an aircraft wing.

FIG. 1 is an enlarged view of a tip portion of one of the wings 1. The wing has a central elongation direction indicated as 4, which extends away from the body of the aircraft.

The underside of the wing 1 (as viewed in FIG. 1) is an aerodynamic surface which defines or approximates a horizontal plane. For example, the lifting surface of the wing 1 may optionally be flat, or it may be curved but the horizontal plane may be defined by cords (imaginary straight lines joining the leading and trailing edges of the wing 1). Note that a respective horizontal plane is defined with respect to each wing 1, and the two horizontal planes are often not identical to each other due to dihedral or anhedral design. In practice, the plane described may also twist in the spanwise direction (a design feature known as 'washout' in the aerospace industry). This twist is disregarded for the purposes of clear description below.

The air-redirection formation 2 provided at a tip portion of each wing 1 is typically formed as a device which is first constructed and then attached to the tip portion of the wing 1. Note that in variations of the embodiment the air-redirection formation 2 may be constructed as part of the fabrication process of the wing 1, e.g. integral with the wing.

The device 2 includes a first portion 21 for directing vortices generated by the wing 1 away from the wing 1 which may reduce drag and may maintain higher overall lift on the main wing. A lower surface of the first portion 21 is a continuation of the aerodynamic lifting surface (under surface) of the wing 1.

The device 2 further includes a second portion 22 that may produce lift using the vortices directed away from the wing 1 by the first portion 21. More generally, in variants of the embodiment it may generate local aerodynamic forces from the airflow, either positive (e.g. traditionally 'up' against the gravity vector) or negative (e.g. traditionally 'down' towards ground). The second portion 22 is spaced from the wing 1 by the first portion 21.

The first and second portions 21, 22 of the device 2 are connected by a connection structure 23. The connection structure 23 maintains the first and second portions 21, 22 of the device in a spaced-apart configuration. The implementation may blend 21, 22 and 23 into a single continuous shape and structure in practice, and defining the boundaries between them is arbitrary for the sake of explanation.

Both the first and second portions 21, 22 of the device 2, or at least their respective lower surfaces, are substantially in the horizontal plane.

The connection structure 23 has a key aerodynamic effect, as well connecting the rear portion to the main wing. It preferentially moves the vortices, in the direction away from the wing 1 and towards the second portion 22. It is canted downwardly, and also swept back. Canting downwardly means projecting in a direction which has a downward component (that is, in the direction away from the wing tip in the direction transverse to the horizontal plane of the wing, toward the lower surface of the wing from the top surface). Sweeping rearwardly means projecting in a direction which has a component in the rear direction (that is, a direction within the horizontal plane which is transverse to the central elongation direction 4, and generally towards the rear of the aircraft).

Figure 2:
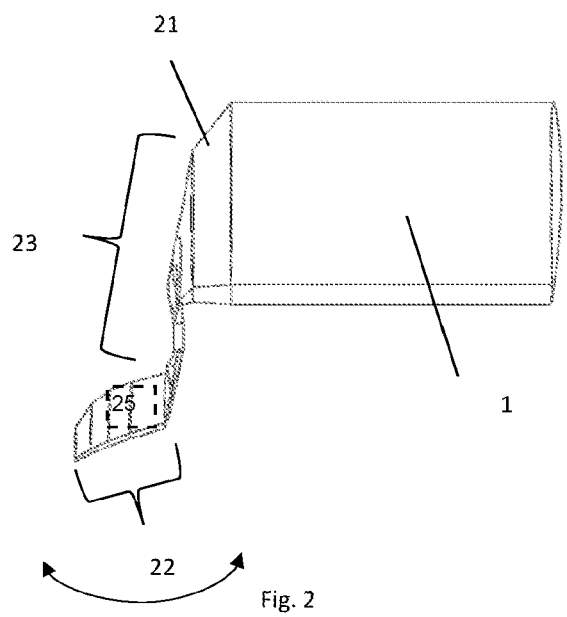
FIG. 2 is a top view of the device of FIG. 1.
Figure 3:
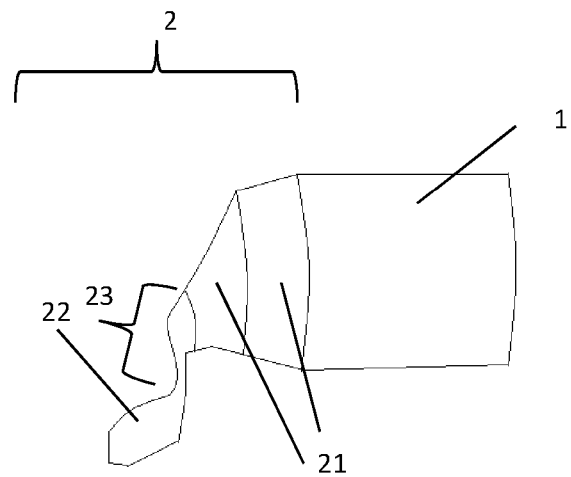
FIG. 3 is a further top perspective view of the device of FIG. 1.

As shown most clearly in FIGS. 2 and 3, the device 2 has its maximum chord (extension in the direction from the leading edge of the wing 1 to the trailing edge) near where it contacts the wing 1. At successive positions in the direction 4, the device 2 (and thus the combination of the wing 1 and the device 2) has a narrowing (reducing) minimum distance between the leading and trailing edges (the local "thickness"), which generally corresponds to a reduction in the chord. Connection structure 23 may be the thinnest by minimum dimension (local thickness) but for implementations with more extreme sweep, this section may extend in the chordwise direction of wing 1, meaning that the chord at this point, by strict interpretation, could be the longest even though the leading edge and trailing edge are closest to each other. The chord of the second portion 22 may be greater or less than the chord of the main wing 1. In FIG. 1, the direction A indicates the wing chord direction, and arrow D indicates the direction of the minimum local thickness at a particular local position.

The first portion 21 of the device 2 may have a fixed positional relationship with respect to the wing 1. However, optionally, the second portion 22 of the device 2 may be provided with an actuator 25 (the placement of the dashed box in FIG. 2 is for illustration only and does not indicate the position of the actuator 25) which is controllable (typically based on signals generated within the body of the aircraft and transmitted to the actuator) to move relative to the wing 1. Thus a control surface (e.g. lower surface) of the second portion 22 of the device 2 can act as a control surface, under control of the pilot, for steering the aircraft.

As indicated by the double-headed arrow in FIG. 2, the position of the second portion 22 of the device 2 may, in one possibility, be movable about a yaw axis, e.g. by hinging or warping.

In this embodiment the device 2 is outboard the tip of the wing 1, and extends principally away from the body of the aircraft, e.g. the outer tip of the second portion 22 is spaced from the central axis 4 of the wing 1 principally in the "vertical direction" (i.e. perpendicular to the horizontal direction). However, in variations of the embodiment, the device 2 may project partially or wholly rearwardly from the wing 1 (i.e. in the direction in which air flows away from the wing 1) or inboard of the outer edge of the wing.

Figure 5:
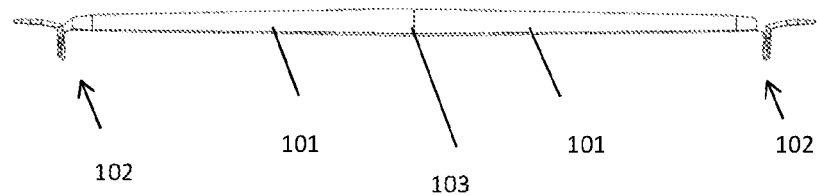
FIG. 5 is a front view of an aircraft including, at a tip portion of each wing, a device which is a second embodiment of the invention.
Figure 6:
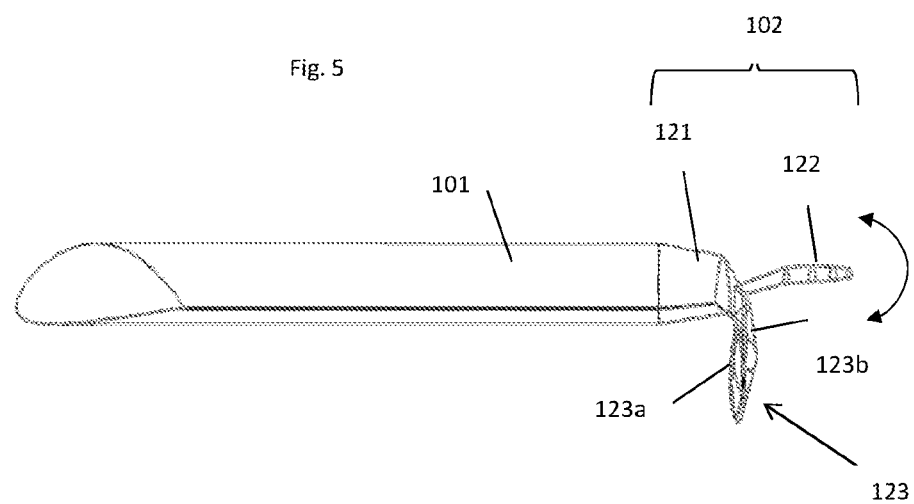
FIG. 6 is a view of a tip portion of a wing of the aircraft of FIG. 5 including the device of FIG. 5.
Figure 7:
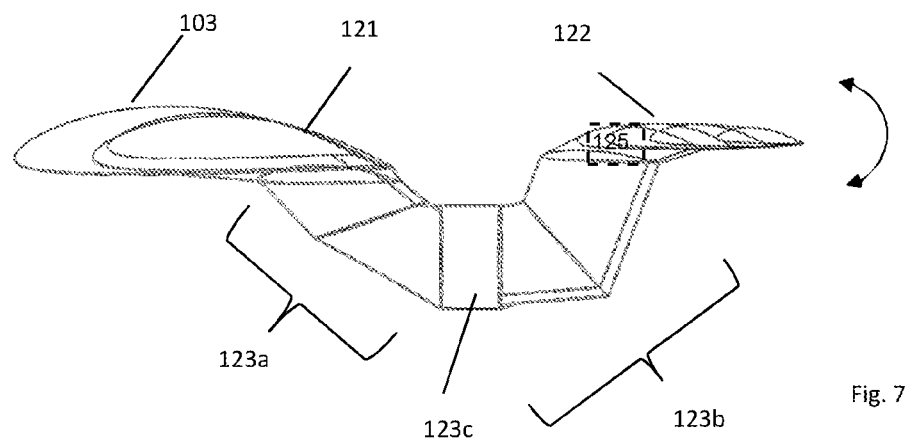
FIG. 7 is an end view of the wing of the aircraft of FIG. 5.

Turning to FIGS. 5-7, a second embodiment of the invention is shown. Reference numerals of elements corresponding to those of the first embodiment are 100 higher. In this second embodiment too, each of the wings 101 of the aircraft, which extend outwards from the body 103 towards respective wing tips, is provided at a tip portion with a device 102. This device may be constructed separately from the wing 101, and attached to the wing 101 subsequently. Each of the wings 101 defines a respective horizontal plane, as described above.

The device 102 comprises a first portion 121 and a second portion 122. Both lie substantially in the horizontal plane of the corresponding wing 101. The first portion 121 includes a surface (e.g. lower surface) which acts as a continuation of the aerodynamic lifting surface of the wing 101, and directs vortices generated by the wing 101 away from the wing 101 to reduce drag. The second portion 122 may produce lift using the vortices directed away from the wing 101 by the first portion 121.

The first and second portions 121, 122 are connected by a connection structure 123, having a first connection element 123a and a second connection element 123b, joined together by a third connection element 123c. The first connection element 123a is attached to the first portion 121 of the device 102, but projects rearwardly (i.e. in the left-to-right direction in FIG. 7; which is the general direction of airflow over the wing 101) and downwardly from it. The second connection element 123b is attached to the second portion 122 of the device 102, but projects forwardly and downwardly from it. The third connection element 123c which joins the first and second connection elements 123a, 123b is entirely below the first and second portions 121, 122 of the device 102.

Optionally, at least the second portion 122 of the device 102, is movable relative to the first portion 121 and the wing 103. This is done under the control of an actuator 125 (the placement of the dashed box in FIG. 7 is for illustration only and does not indicate the position of the actuator 125), typically controlled from within the aircraft body. Thus a control surface (e.g. lower surface) of the second portion 122 of the device 102 can act as a control surface, under control of the pilot or autopilot, for steering the aircraft.

For example, as illustrated by the arrow in FIG. 6, the lower surface (control surface) of the second portion 122 of the device 102 may be movable in a roll axis, e.g. by hinging or warping. Alternatively or additionally, as illustrated by the arrow in FIG. 7, the control surface of the second portion 122 of the device 102 may be movable about a pitch axis, e.g. by hinging or warping.

Although only two embodiments of the invention have been described in detail, many variations are possible within the scope of the claims, as will be clear to a skilled reader. For example, movement of the devices 2, 102 may not be limited to movement of the second portions 22, 122 of the devices 2, 102. Rather, the first portions 21, 121 also may be movable relative to the wing 1, 101.

Figure 4:
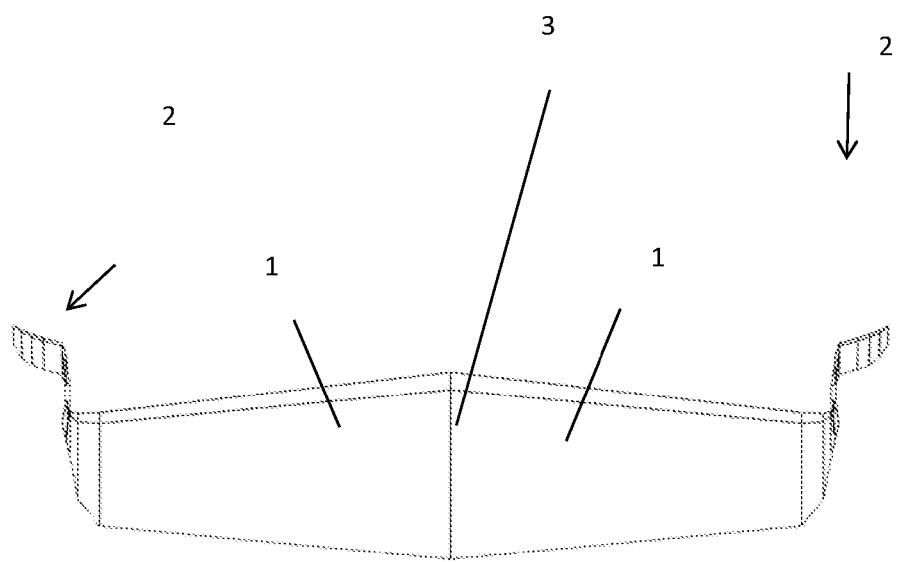
FIG. 4 is a view of an aircraft including the device of FIG. 1 on each wing.

Furthermore, whereas FIGS. 4 and 6 show aircraft having two wings, in other embodiments the aircraft may include only a single continuous wing (e.g. not interrupted by a main aircraft body). A device which is an embodiment of the invention may be provided at either end, or more typically both ends, of such a wing.

What is claimed is:

1. An air-redirection formation for a tip portion of an aerofoil which includes:
   a first portion, which includes a first surface which forms a continuation of an aerodynamic lifting surface of the aerofoil, and which is for directing vortices away from the aerofoil; and
   a second portion which is connected to the first portion by a connection structure which is canted downwardly and swept back, the second portion including a second surface spaced from the first portion by the connection structure and which is positioned to interact with the directed vortices
   wherein, defining a horizontal plane of the aerofoil by chords extending from the leading edge of the aerofoil to the training edge, the first surface is in the horizontal plane.

2. An air-direction formation according to claim 1 which is provided as a device which is separate from, but connectable to, a tip portion of the aerofoil.

3. An air-direction formation according to claim 1 which is connected to an aerofoil.

4. An air-redirection formation according to claim 3 further including a controllable actuator for controlling a rotational and/or translational position of the first and/or second portions of the formation relative to the aerofoil.

5. An air-redirection formation according to claim 4 in which the actuator is operative to control a rotational position of the first and/or second portions of the formation about a span-wise axis of the aerofoil.

6. An air-redirection formation according to claim 4 in which the actuator is operative to control a rotational position of the first and/or second portions of the formation about a chord-wise axis of the aerofoil.

7. An air-redirection formation according to claim 4 in which the actuator is operative to control a rotational position of the first and/or second portions of the formation about a yaw axis of the aerofoil.

8. An air-redirection formation according to claim 4 in which the actuator controls a said rotational and/or translational position about a rotational axis by deforming a portion of the formation.

9. An air-redirection formation according to claim 3, in which the second surface is within 90 degrees of the horizontal plane.

10. An air-direction formation according to claim 3 in which the first and/or second portions of the air-redirection formation extend parallel to an elongation axis of the aerofoil.

11. An air-direction formation according to claim 3 in which at least the first portion of the air-redirection formation extends rearwardly from the main surface of the aerofoil in a direction opposite to a direction in which the aerofoil passes through ambient air.

12. An air-direction formation according to claim 3 in which the connection structure is connected to the first portion at a location on the first portion furthermost from the aerofoil.

13. An air-redirection formation according to claim 3, in which the second surface is within 15 degrees of the horizontal plane.

14. An air-redirection formation according to claim 3, in which the second surface is within 45 degrees of the horizontal plane.

15. An air-direction formation according to claim 1 which is connected to an aerofoil, and in which the connection structure has a smaller maximum chord length than the maximum chord length of the first and/or second portions of the air-redirection formation.

16. An air-direction formation according to claim 15 in which the connection structure comprises at least two joined connection elements,
a first one of the connection elements being connected to the first portion of the air-redirection formation, and having an elongation direction which extends away from the first portion of the air-redirection formation, and which has a component transverse to the horizontal plane in a first direction; and
a second of the connection elements being connected to the second portion of the air-redirection formation, and having an elongation direction which extends away from the second portion of the air-redirection formation, and which has a component transverse to the horizontal plane in the first direction.

17. An air-direction formation according to claim 1 attached to a anhedral wing.

18. An air-direction formation according to claim 1 wherein, in a direction away from the aerofoil, a sweep angle increases and, at the second portion, the sweep angle reduces again.

19. An air-direction formation according to claim 1 wherein, in a direction away from the aerofoil, both sweep angle and cant increase and then reduce for the second section.

20. An aircraft having a plurality of wings, a tip portion of each of the wings including a respective air-redirection formation which includes:
a first portion, which includes a first surface which forms a continuation of an aerodynamic lifting surface of the wing, and which is for directing vortices away from the wing, and
a second portion which is connected to the first portion by a connection structure which is canted downwardly and swept back, the second portion including a second surface spaced from the first portion by the connection structure and which is positioned to interact with the directed vortices
wherein, defining a horizontal plane of the wing by chords extending from the leading edge of the wing to the training edge, the first surface is in the horizontal plane.

* * * * *